(12) United States Patent
Moulton et al.

(10) Patent No.: US 7,113,325 B1
(45) Date of Patent: Sep. 26, 2006

(54) WAVELENGTH CONVERSION METHOD WITH IMPROVED CONVERSION EFFICIENCY

(75) Inventors: Peter F. Moulton, Concord, MA (US); Alex Dergachev, Acton, MA (US); Genta Masada, Naka (JP); Ichiro Sekine, Naka (JP); Masakuni Takahashi, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 11/381,482

(22) Filed: May 3, 2006

(51) Int. Cl.
*G02F 1/35* (2006.01)
*G02F 1/37* (2006.01)
*G02F 1/39* (2006.01)

(52) U.S. Cl. .................. 359/326; 359/328; 359/330
(58) Field of Classification Search ......... 359/326–332
See application file for complete search history.

(56) References Cited

U.S. PATENT DOCUMENTS

| | | | |
|---|---|---|---|
| 4,019,159 A | | 4/1977 | Hon et al. |
| 4,181,899 A | | 1/1980 | Liu |
| 4,879,722 A | * | 11/1989 | Dixon et al. ............... 372/21 |
| 5,142,542 A | * | 8/1992 | Dixon ....................... 372/22 |
| 5,206,868 A | * | 4/1993 | Deacon ..................... 372/21 |
| 5,333,142 A | * | 7/1994 | Scheps ...................... 372/22 |
| 5,408,481 A | * | 4/1995 | Scheps ...................... 372/22 |
| 5,412,674 A | * | 5/1995 | Scheps ...................... 372/22 |
| 5,638,388 A | * | 6/1997 | Nighan et al. ............. 372/22 |
| 5,892,783 A | * | 4/1999 | Holsinger ................... 372/34 |
| 5,898,718 A | | 4/1999 | Mohatt et al. |
| 6,373,868 B1 | * | 4/2002 | Zhang ........................ 372/19 |
| 6,744,547 B1 | | 6/2004 | Ikeda et al. |

OTHER PUBLICATIONS

D. Hon, "High average power, efficient second harmonic generation," Chapter B2 in *Laser Handbook*, vol. 3, Ed. M. L. Stitch, North-Holland Pub. Co., Amsterdam, New York 1979.

Boyd and Kleinman "Parametric Interaction of Focused Gaussian Light Beams," *Journal of Applied Physics*, vol. 39, No. 8, pp. 3597-3639, Jul. 1968.

* cited by examiner

*Primary Examiner*—John D. Lee
(74) *Attorney, Agent, or Firm*—Darby & Darby

(57) ABSTRACT

A nonlinear optical conversion device includes a nonlinear crystal having entrance and exit surfaces allowing input and output laser beams to propagate in the phase-matching plane for a desired nonlinear generation process. The nonlinear generation process involves a nonlinear interaction in the nonlinear crystal and resultant conversion of power in one or two input beams into power in the output beam. The nonlinear crystal is characterized by absorption and resultant modification of the crystal properties by the power in the output beam, the modification with the potential for reducing the efficiency of the nonlinear process in the crystal, and the nonlinear process involving critical phase-matching in the nonlinear crystal in which the powers in the output beam and input beam or beams propagate in different directions through the process of Poynting vector walk-off. The input beam or beams are of a sufficiently small beam dimension in the phase-matching plane.

16 Claims, 3 Drawing Sheets

WAVELENGTH CONVERSION METHOD WITH IMPROVED CONVERSION EFFICIENCY

BACKGROUND OF THE INVENTION

1. Field of the Invention

The present invention relates to a wavelength conversion method that converts the wavelength of a coherent light beam or beams using a nonlinear optical wavelength conversion element, the main object thereof being to improve the conversion efficiency for the case where some of the power involved is absorbed in the conversion element.

2. Description of the Prior Art

It is known that lasers and nonlinear optics can be used in combination to produce coherent radiation at other wavelengths than the fundamental wavelengths produced by the lasers. One example is harmonic generation, where the new wavelengths are an integer division of the fundamental wavelengths. Another example is sum-frequency generation, where the new wavelength is equivalent to the sum of the frequencies (speed of light/wavelength) of two lasers. A further example is difference-frequency generation, where the new wavelength is equivalent to the difference of the frequencies of two lasers. It is also possible to have cascaded systems where the nonlinear-generated beam or beams drives another nonlinear-generation scheme. Such nonlinear optics can include nonlinear crystals in which the conversion of wavelengths occurs. For example, crystals with symmetries that lack a center of inversion can effectively generate a wavelength that is half the laser wavelength, a process known as second-harmonic generation, since they can produce output that is proportional to the square of the electric field of the laser beam inside the crystal. This so-called second-order nonlinearity can also be used for sum-or difference-frequency generation. We refer to the laser beam or beams (or beams that result from another nonlinear-generation process) as the input beam or beams and the resultant nonlinear-generated beam as the output beam.

In order to obtain efficient harmonic, sum- or difference-frequency generation in a nonlinear crystal, it is necessary to arrange the electric fields of the input and output beams to be in phase with each other as they propagate in the crystal. If they are, the power of the output beam can grow along the length of the crystal and lead to efficient conversion of energy from that of the input beam or beams, provided that the intensity (power/unit area) of the beam or beams is sufficiently high. If the beams do not stay perfectly in phase, the power in the output beam can convert back into power in the input beam or beams, and the efficiency (output beam power/input beam or beams power) is reduced, in the worst case to no conversion at all. The process of keeping the beams in phase is commonly referred to as phase-matching.

In crystals, phase-matching can be accomplished, for example, for beams all propagating along the same direction, if the refractive indices for all wavelengths involved are the same. However, the refractive indices are in general a function of wavelength. Throughout the near-infrared, visible and ultraviolet (UV) wavelength regions, most crystals (for a given polarization and propagation direction in the crystal) exhibit normal dispersion, an increase in refractive index with decreasing wavelength. Thus, phase-matching can only be achieved through the use of birefringent crystals in which the refractive indices are also a function of the polarization of the beam and the direction of propagation in the crystal. By the appropriate choice of polarization and beam propagation direction in the crystal for the input beam or beams and output beam, it is possible in many nonlinear crystals to obtain phase-matching. In the case in which the all the beams propagate along one of the principal axes of the crystal, the process on non-critical phase-matching is said to occur. In all other cases, the process is referred to as critical phase-matching.

It is well known that the refractive indices in crystals in general change with changes in crystal temperature. This can be used to advantage in nonlinear optical systems, since the temperature can often be adjusted to achieve exact phase-matching. However, the change of refraction with temperature can also present a practical problem. If the nonlinear crystal is adjusted for exact phase-matching at one temperature, the nonlinear conversion efficiency will drop if the temperature varies, by an amount that depends on the particular characteristics of the crystal.

Nonlinear crystals absorb some of the power from the input beam or beams and from the output beam. The absorption can be due to several processes, including absorption from electronic or vibrational transitions inherent in the crystal, absorption from impurities or defects in the crystal, nonlinear effects such as two-photon absorption and more complex phenomena such as absorption from transient crystal defects, or color centers, created by the input or output beams. Absorption has one direct effect, the reduction in the power of the output beam. There is a second, indirect effect that often is more significant. The absorbed power leads to heating in the nonlinear crystal, and the subsequent change in the crystal temperature can result in a loss of perfect phase-matching, reducing the power in the output beam. Even when the absorption is small enough to cause only a minor direct loss of output power, the indirect effect of heating and subsequent loss of exact phase-matching can cause a drastic reduction in output power. If the temperature rise was uniform through the volume of the nonlinear crystal, the crystal orientation could be adjusted to compensate, or the crystal temperature could be adjusted through means of external heaters or chillers. In practice, the dynamical nature of the heating can make compensation for heating difficult to implement. The problem is particularly challenging when the output power is responsible for creating the heating. Also, the heating is generally not uniform throughout the volume of the crystal, due to the nature of the absorption and the spatial variation of the power in the laser and output beams. Thus, correction for the heating effect is generally incapable of eliminating all the reduction in output power.

One other effect that can reduce nonlinear power is some crystals is photo-refraction. In this effect, the laser or non-linear-generated beams create defects in the nonlinear crystal that have electrical charge. The resultant electric field produced in the material changes the refractive index through the electro-optic effect, and that can lead to destruction of perfect phase-matching. As with heating, the effect is difficult to correct because of non-uniformities in the input or output beams and the resultant non-uniformities in the photo-refraction effect in the crystal.

The recognition of the effect of heating in the nonlinear crystal has led to several techniques to compensate for it.

U.S. Pat. No. 4,019,159 issued Apr. 19, 1977 to Hon et al. describes a method using an electric field to control the refractive indices of a nonlinear crystal and compensate for the effects of heating.

U.S. Pat. No. 4,181,899 issued Jan. 1, 1980 to Liu shows a device where the temperature of the nonlinear crystal is monitored electronically, and through control electronics and a voltage-controlled tuning element, the wavelength of the laser driving nonlinear crystal is adjusted to maintain phase-matching as the crystal temperature changes due to heating.

U.S. Pat. No. 5,898,718 issued to Mohatt et al. teaches a crystal heater design that establishes a gradient in temperature along the length of the nonlinear crystal, in part to compensate for non-uniform heating from the second-harmonic output beam.

U.S. Pat. No. 6,744,547 B2 issued to Ikeda et al. describes a temperature control method for a nonlinear crystal that adjusts the crystal temperature to correct for changes in the average power of the input beam.

A book chapter by Hon (D. Hon, "High average power, efficient second harmonic generation," Chapter B2 in Laser Handbook, Volume 3, Ed. M. L. Stitch, North-Holland Pub. Co., Amsterdam, N.Y., 1979) describes a number of techniques to generate high second-harmonic powers in the presence of nonlinear crystal heating.

However, all the techniques attempt to correct for the heating effects after they occur in the crystal and do not generally address means to reduce the effects in the crystal itself. Since the techniques discussed 1) add more complexity to the overall nonlinear conversion system and 2) are in general not fully effective in eliminating the reduction in nonlinear conversion there is a need for other means to reduce heating and other deleterious effects in nonlinear crystals.

SUMMARY OF THE INVENTION

Accordingly, it is the object of this invention to provide a means of reducing the effects of absorption of input or output power on the phase-matching conditions in a nonlinear crystal.

Another object of the invention is to improve the conversion efficiency of a nonlinear crystal by reducing the effects of absorption of the input and output beams on the phase-matching process in the nonlinear crystal.

The means of reducing the effects of absorption are to construct a device comprising a nonlinear crystal having entrance and exit surfaces allowing the input beam or beams and output beam to propagate in the phase-matching plane for the desired nonlinear generation process. The nonlinear generation process involves the production of power in the output beam based on the nonlinear interaction in crystal of one or two input beams, the nonlinear process involves critical phase-matching in the nonlinear crystal in which the power flows generated in the output beam and that of the input beam or beams propagate in different directions through the process of double refraction, often referred to as Poynting vector walk-off. The nonlinear crystal is characterized by absorption and resultant heating in the crystal created by the power in the output beam, the heating with the potential for reducing the efficiency of the nonlinear process through creation of temperature variations or photorefractive effects in the crystal, and the input beam is of a sufficiently small beam dimension in the phase-matching plane such that the output beam spatially separates from the input beam or beams in a length that is small compared to the length of the crystal, and thereby removes much of the heating in the nonlinear crystal from the region of the nonlinear interaction involving the input beam or beams.

DETAILED DESCRIPTION OF THE PRESENT INVENTION

Figure 1:
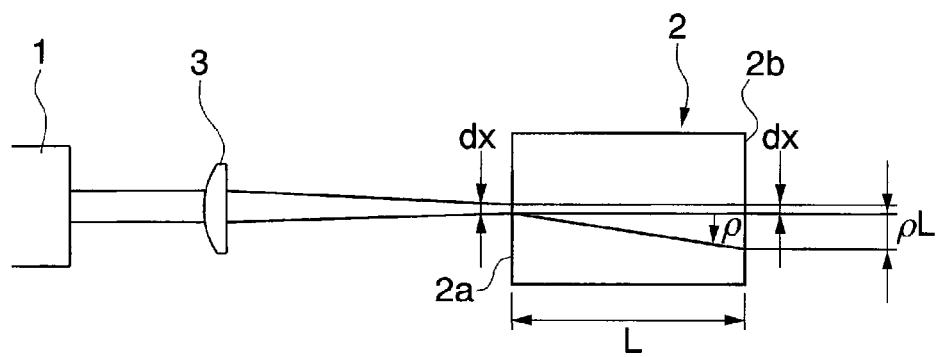
FIG. 1 is a plan view of the improved wavelength conversion method, showing a laser, focusing lens and nonlinear element operating with large walkoff of the generated harmonic beam.

The principle of the present invention is based on the discovery that, when there is significant absorption created by the output beam in a nonlinear crystal, a design that includes substantial walkoff of the output beam from the input beam or beams can be more efficient in nonlinear generation than a configuration where walkoff is minimal and the conversion efficiency is predicted to be equivalent or higher.

The effect of Poynting vector walkoff in birefringent crystals is well known. Consider two beams of linearly polarized light that initially are launched into the crystal in the same direction, with one beam of light polarized parallel to one of the principal axes in the crystal, the other with light polarized at some arbitrary angle to the principal axes. Because of birefringence, the direction of power flow (that of the Poynting vector) is different from the initial direction of light for the beam polarized at the arbitrary angle. For light polarized parallel to a principal axis, the power flow and initial directions are the same. The direction of power flow in the arbitrary-polarization beam is said to "walk off" from the direction of power flow for the parallel-polarized beam. The angular difference is called the walkoff angle.

A common arrangement for birefringent phase-matching is to arrange the polarization of the input beam or beams to be perpendicular to that of the output beam. This is referred to as Type I phase-matching. In most cases, either the input-beam or the output-beam polarization is parallel to one of the principal axes of the crystal. For critical phase-matching, this means that the other beam (or beams) will not be polarized parallel to a principal axis, and will thus exhibit walk-off. While efficient conversion can be obtained in the presence of walkoff, the output beam becomes elongated in the plane defined by the beam direction vector and a vector orthogonal to the principal axis. Also, even if the input beam is diffraction-limited, with significant walkoff the output beam quality will become degraded to worse than diffraction-limited.

Consider a circular cross section input beam with a Gaussian-distribution intensity profile, the latter characteristic of a diffraction-limited laser beam. The beam radius, w, is the distance from the beam center at which the intensity is a factor $1/e^2$ of the intensity at beam center. Following an analysis by Boyd and Kleinman (Journal of Applied Physics, Volume 39, p. 3597, 1968) if the beam walkoff angle is given by ρ, in radians, the effective distance over which the nonlinear interaction occurs, $l_a$, the aperture length, is given by the formula:

$$l_a = w(\pi)^{1/2}/\rho$$

For crystals with a length longer than $l_a$, the output power grows as just the length of the crystal, rather than the square of the length as would be true where the length was smaller the $l_a$. Also, in the case of long crystals, the output beam becomes elongated in the walkoff direction and the beam quality is degraded, even when the input beam or beams are circular and are diffraction-limited. The elongation, for crystals much longer than the aperture length, is approximated by ρL. where L is the length of the crystal. The linear dependence of the output power on crystal length can be simply viewed as the summation of power from individual short lengths (of order $l_a$) in the nonlinear crystal, in contrast to the coherent buildup of power with no walkoff, which is proportional to the square of the crystal length.

FIG. 1 is a plan-view illustration of beam walkoff. The output beam from a laser or other coherent source 1 is focused into a nonlinear, birefringent crystal 2 by a lens 3. The crystal plane illustrated is the one in which walkoff occurs. The beam enters the input face 2a of crystal 2 and exits through the opposite face 2b. Crystal 2 has a length L along the beam, and the input beam has a diameter dx at the input face 2a. For simplicity of illustration, we neglect the effects of beam diffraction in the crystal. The output beam generated from nonlinear conversion, because of critical phase-matching, has a walkoff angle ρ and as a result is elongated in the walkoff plane, with the elongation approximated by ρL in the illustration.

The theoretical calculations of Boyd and Kleinman show that, for a given length of nonlinear crystal, the conversion efficiency for circular beams continues to improve with reducing beam radius up to some value, even as the aperture length becomes much smaller than the crystal length and the output beam increases in elongation and reduces in quality.

In order to avoid beam elongation and degradation, while still getting high conversion efficiency one can use a more sophisticated approach to the design of the input beam. Since the walkoff is only in one plane of the beam, the beam size can be made large enough in that plane to minimize walkoff, by establishing the aperture length to be comparable to or greater than the crystal length, but can be reduced to a small size in the orthogonal plane where there is no walkoff to increase the intensity of the input beam. Thus, rather than a circular beam, one can use an elliptical beam, with the long axis of the elliptical beam cross section aligned in the walkoff plane. With elliptical beams one can, in theory, get equivalent conversion efficiencies to those achievable with circular beams, without the associated elongation and reduction of output beam quality.

In the embodiment described here, operation where the input-beam aperture length is much shorter than crystal length is claimed to be advantageous over a theoretically superior design where the aperture is comparable to or greater than the crystal length, when the output beam is absorbed in the nonlinear crystal, or induces absorption of the pump beam, or creates other forms of phase-matching perturbation, such as photorefractive damage. The process of nonlinear generation, with requisite phase-matching, occurs only in the region of the crystal where the input beam or beams and the output beam spatially overlap. For a given crystal, if the input beam or beams are focused to a small enough beam radius to make the aperture length much shorter than the crystal length, most of the total output power is spatially separated from the input beam. In the case where the output beam power is directly absorbed, most of the heating in the crystal occurs in a region where there is no requirement for phase-matching, in contrast to designs where the aperture length is arranged to be greater than or equal to the crystal length. The reduced impact on phase-matching also occurs for the case where the output beam induces absorption of the input beam, through, for example, the creation of defect centers, or when the output beam creates photorefractive perturbations.

As an example of the invention, a specific example is shown involving the use of the nonlinear material lithium tetraborate ($Li_2B_4O_7$), hereafter referred to as LB4. The material is uniaxial, that is, there is one direction for light to propagate along (the optic axis) which the refractive index (the ordinary index) is independent of polarization. For all other directions different polarizations experience different refractive indices. For LB4 the refractive index for light with a polarization parallel to the optic axis (the extraordinary index) is smaller that that of the ordinary index, and the material is referred to as negative uniaxial. In LB4, it is possible to obtain Type I critical phase-matching for input beam wavelengths in the near-infrared and visible wavelength regions, when the input beam is polarized perpendicular to the optic axis, and thus experiences the ordinary index, and the output beam is polarized perpendicular to the input beam, thus experiencing a mix of extraordinary and ordinary refractive indices that allow phase-matching. Thus, for LB4, the output beam walks off from the input beam.

Our studies for second-harmonic generation in LB4 with a (green) input wavelength of 523.5 nm have shown evidence of crystal heating which is identified with absorption induced by the resultant UV output wavelength of 262.25 nm. The exact nature of the absorption has yet to be identified, but is likely some combination of non-linear, two-photon absorption and absorption associated with the formation of color centers in the crystal. The color centers may be initially produced as a result of two-photon absorption. Our studies show that raising the crystal temperature can reduce the effects of absorption, possibly by thermal destruction of the color centers. The color centers may create absorption for not only the UV beam but also the input green beam, based on published results on LB4 crystals with color centers created by electron-beam excitation (I. N. Ogorodnikov et al. Physics of the Solid State, Vol. 44, pp. 1085–1092, 2002).

For our experimental work that shows the advantages of the present invention, we employ LB4 crystals with two different arrangements of the input beam to the crystal. The input beam is from the 523.5-nm, linearly polarized, second harmonic of a cw, diode-pumped, repetitively Q-switched Nd:YLF laser system operating at a pulse rate of 30 kHz. The laser system consists of a low-power, Q-switched oscillator followed by four amplifier stages. The 1047-nm output of the laser is converted to the second harmonic by non-critical, Type-I-phase-matched, $LiB_3O_5$, nonlinear crystal. The average power in the second-harmonic beam is as much as 30 W, the pulsewidth is 8 nanoseconds, and the beam quality is better than 1.2 times the diffraction limit.

For the crystal LB4, the phase-matching condition requires that the 523.5-nm input beam be polarized perpendicular to the optic axis of the LB4 crystal. The polarization of the second harmonic output beam is perpendicular to that of the input beam and lies in a plane containing the optic axis. The input beam direction is required to lie in the same plane, at an angle of approximately 67 degrees to the optic axis for a crystal temperature of 25 C. For this example, we raise the crystal temperature to 350 C in order to reduce the absorption of the output beam, and at that temperature the phase-matching beam direction is approximately 70 degrees.

Figure 2:
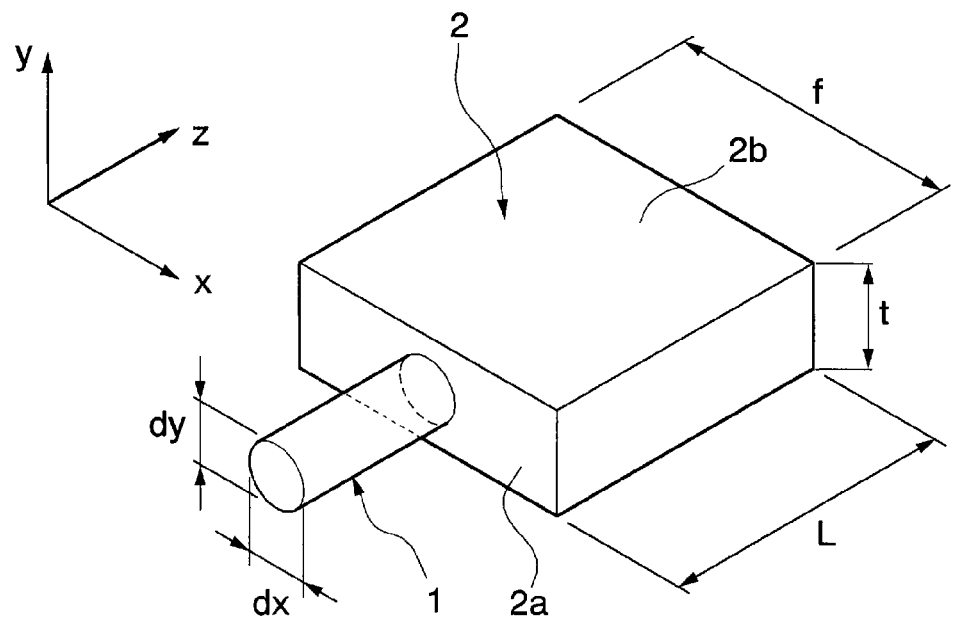
FIG. 2 is a perspective view of the input beam and nonlinear crystal.

To aid in describing the example, FIG. 2 shows a perspective view, with Cartesian direction axes indicated, of an input beam incident 1 incident on the LB4 nonlinear crystal 2, having an input face 2a and surface 2b, with a length, L, thickness, t and width, f. The input beam is, in general, not round and is characterized by a diameter dx in the horizontal direction x and a diameter dy in the vertical direction y. The input beam is directed to propagate along the z axis. Both diameters are a function of the longitudinal direction z. For beams that are close to the diffraction limit in quality, such as those used in the example described here, the intensity profile of the beam, I (x, y, z), is well-approximated by a diffraction-limited, Gaussian distribution of the form $$I(x, y, z) = I_0 \exp[-(x-x_0)^2/w_x(z)^2] \exp[-(y-y_0)^2/w_y(z)^2],$$

where $I_0$ is the intensity in the center of the beam, the center of the beam is located the x and y coordinates $x_0$ and $y_0$, respectively, and the beam radii in the x and y directions are given by $w_x(z)$ and $w_y(z)$, respectively. The diameters (implicit functions of the dimension z) are defined in this case as:

$$d_x = 2w_x(z)$$

and $$d_y = 2w_y(z).$$

For the diffraction-limited, Gaussian approximation to the beam the functional form of the z-dependence of the radii, w, is giving by the well-known expression $$w(z) = w_0\{1 + [(z-z_0)/z_R]^2\}^{1/2},$$

where $w_0$ is the radius at the beam focus point, located at position $z_0$ along the beam direction and $z_R$ is given by.

$$z_R = \pi n w_0^2/\lambda,$$

where $\lambda$ is the wavelength of the beam and n is the refractive index of the material in which the beam propagates.

For the example, the LB4 crystal dimensions are L=40 and 60 mm, t=1 mm and f=5 mm. The optic axis of the LB4 crystal lies in the xz plane, at an angle of approximately 70 degrees to the z axis. The polarization of the input beam is parallel to the y axis, while the output beam polarization is parallel to the x axis. Based on the refractive properties of LB4, the output beam walk-off angle is approximately 27 milliradians. The crystals are heated by conduction, through physical contact of the top face (2b) and opposing bottom face with heated, nickel-plated copper plates, and aluminum foil as an interface between the crystal and the copper.

The general prediction of the power in an output beam generated by nonlinear conversion in our experiments requires computer simulation, due to the complexity of the process. Even without the effects of heating caused by absorption of power in the beams, the non-uniform nature in space and time of the input and output beams combined with the complexity of the mathematical equations required to describe the nonlinear process prevents one from composing a closed-form solution to predict output power. To estimate the output power in the absence of absorption, we used two formulations. One is a computer code called SNLO, available from A. V. Smith, Sandia National Laboratories, Albuquerque, N. Mex. 87185-1423 and also on the Internet at http://www.sandia.gov/imrl/X1118/xxtal.htm. The other is a code that we developed based on the computer simulations developed by A. K. Cousins, and published as "Power Conversion Efficiency in Second Harmonic Generation with Nonuniform Beams", IEEE J. Quantum Electronics 29(1): 217:226, January 1993. The SNLO code is adequate from beams that can be approximated as circular, and can model arrangements in which there is substantial beam walkoff. Our code works well with beams that are highly elliptical, but does not take into account the effect of walkoff, so is suited for prediction of output power beams where the aperture length is comparable to or longer than the crystal length.

Figure 3:
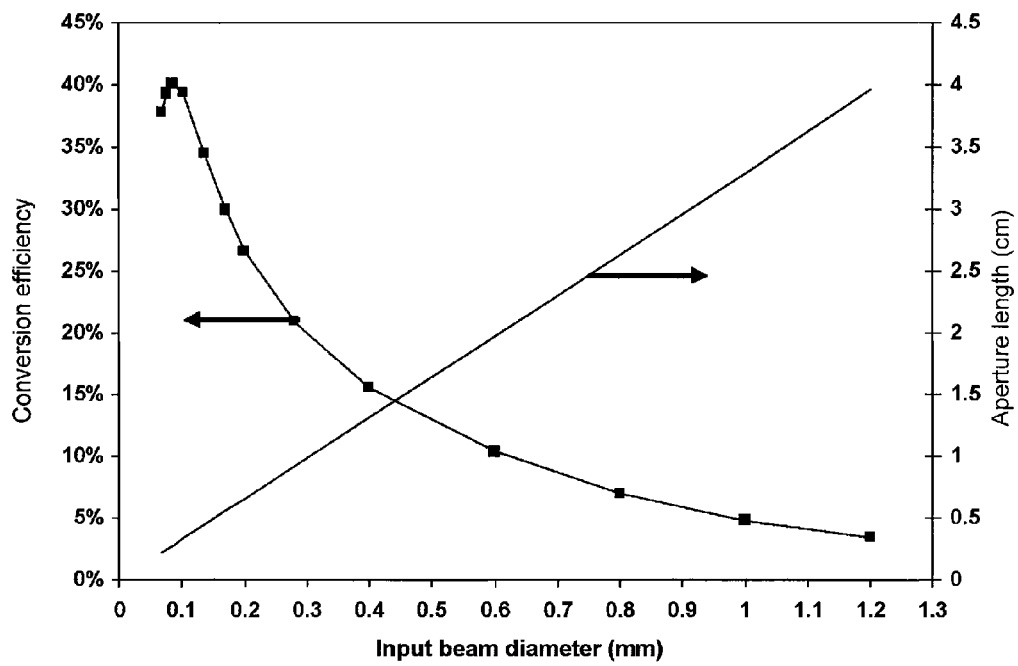
FIG. 3 is a plot of conversion efficiency in the nonlinear crystal and aperture length as a function of input beam diameter.

As an example of the predictions produced by the program, FIG. 3 plots the conversion efficiency calculated by the SNLO code for the 40-mm crystal, at 30 W of input 523.5-nm input power, with a circular cross section, Gaussian input beam having a diameter dx=dy. We also plot in FIG. 3 the aperture length $l_a$ as a function of the input beam radius. High conversion efficiencies are possible, but only when the aperture length is a small fraction of the crystal length. For example, the peak conversion efficiency is predicted to occur at a beam diameter around 0.08 mm, where the aperture length is approximately 2.8 mm. The estimated beam elongation in the walkoff direction would be 1.1 mm and the SNLO code predicts the beam quality would be degraded to about 3× the diffraction limit.

From an a priori design standpoint, to produce a better quality output beam we can employ an elliptical input beam. Using our computer code, we designed an optimized beam that had a value of dx=1.55 mm, which would have an aperture length of 51 mm, and a dy=0.1 mm. We predict for this configuration a conversion efficiency of nearly 28% with 30 W of input-beam power.

Fore the experimental work a variety of lenses, both spherical and cylindrical, are used to form the input beams to the LB4 crystal. Table I shows the two beam arrangements to be used in the description of the results, one (Low Walkoff) corresponding to our optimized elliptical beam that was predicted to produce high bema quality and good conversion. The other (High walkoff) uses a nearly circular cross section beam that also is predicted to produce good conversion, but with less elongation and beam degradation that expected from a circular beam that produces the highest possible conversion. The actual beam diameters are measured by removing the crystals, attenuating the beam, and placing a calibrated video camera at various positions along the beam to determine the position and diameter of the focus. The crystals are positioned so the beam focus is at the center of the long dimension of the crystal. For all but the smallest diameter of 0.10 mm, the diameters of the beams in the crystal at the entrance (2a) and exit faces increase only slightly (<10%) from that in the crystal center. For the smallest beam the y-axis diameter in the 40- and 60-mm crystals increases to approximately 0.13 and 0.16 mm, respectively, at the two crystal faces.

TABLE I

Beam diameters at center of LB4 crystals

| Case | dx (mm) | dy (mm) |
|---|---|---|
| High-walkoff | 0.34 | 0.23 |
| Low-walkoff | 1.55 | 0.10 |

The walk-off of the output beam is in the xz plane, and thus dx is the appropriate diameter to be used in the calculation of $l_a$, the aperture length. For the High-walkoff case the calculated aperture length is approximately 11 mm, while for the Low-walkoff case the aperture length, as noted above, is approximately 51 mm.

Figure 4:
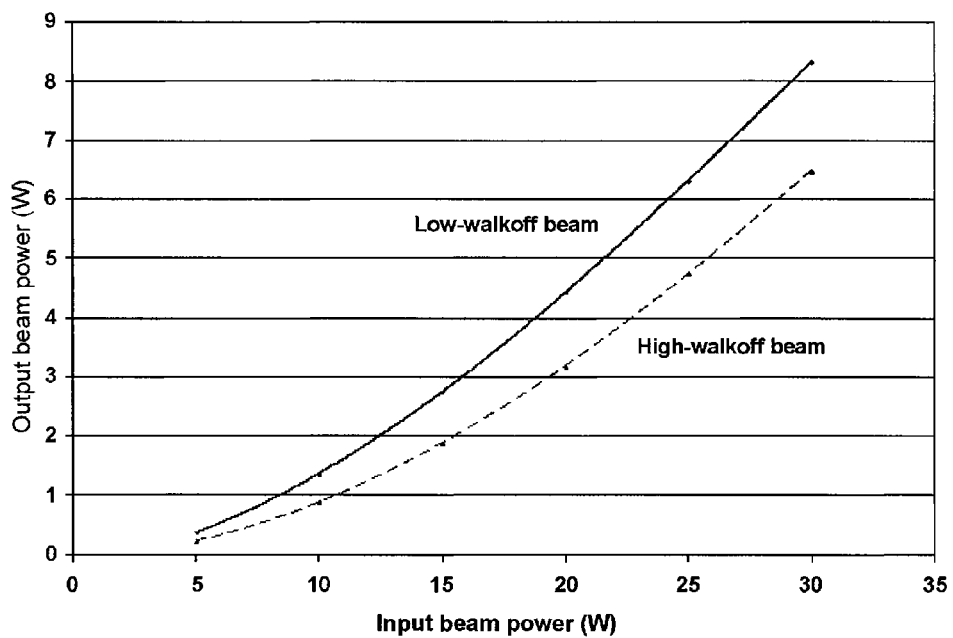
FIG. 4 is a plot of theoretical output beam power vs. input beam power for two beam geometries

FIGS. 3. and 4 plot, respectively, the predicted and observed output-beam power as a function of input-beam power for the Low- and High-walkoff beams described in TABLE I, when used with a 40-mm-long crystal of LB4. We used standard, calibrated thermal power meters to measure the input and output beams, and Pellin-Broca prisms to separate the fundamental and harmonic beams after they exited the nonlinear crystal. The data of FIG. 4 show that at low-powers the Low-walkoff beam does produces more output-beam power, as predicted, but at higher input-beam powers the High-walkoff beam produces significantly greater output-beam power, in direct contradiction to our theoretical calculations. It is also evident that for all but the lowest input-beam powers, the output-beam powers are lower than predicted by theory. We attribute the difference in data and theory to the effect of absorption of the output beam in the nonlinear crystal, and the resultant reduction in nonlinear conversion efficiency caused by this absorption and the resultant disruption of the phase-matching condition in the crystal.

Figure 5:
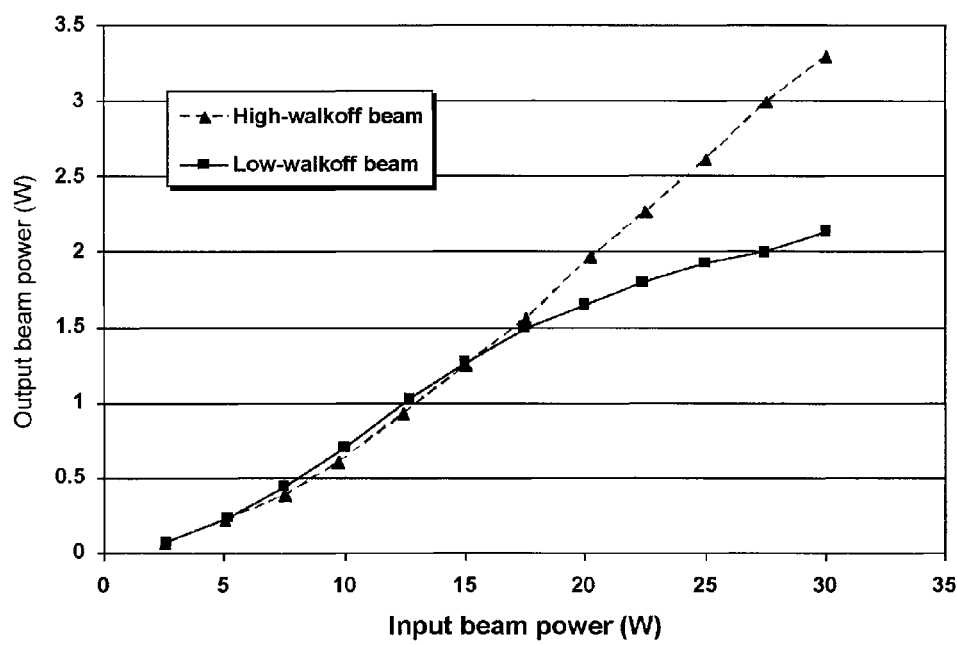
FIG. 5 is a plot of observed data on output beam power vs. input beam power for two beam geometries, in a 40-mm-long crystal.
Figure 6:
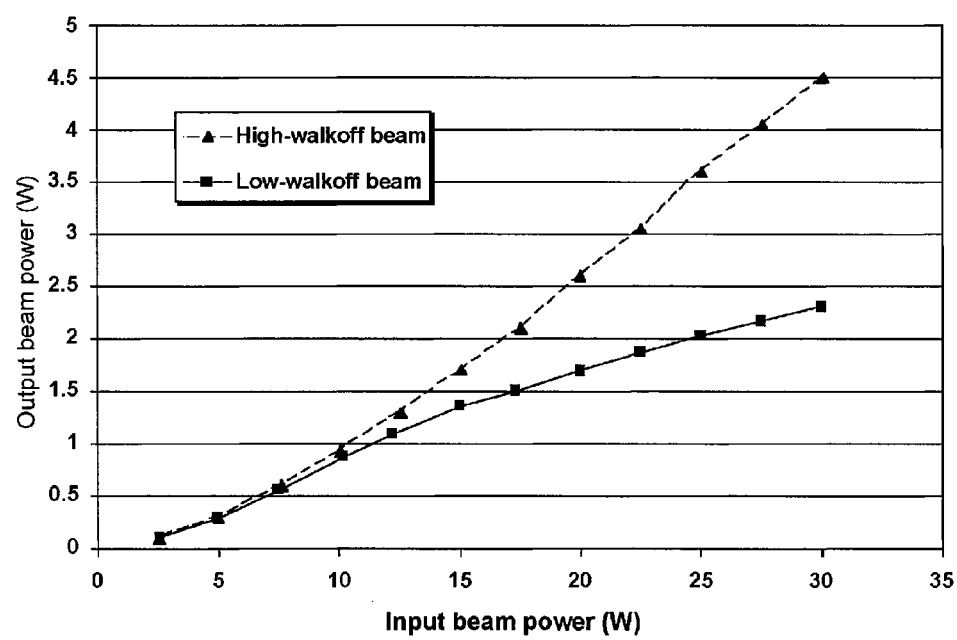
FIG. 6 is a plot of observed data on output beam power vs. input beam power for two beam geometries, in a 60-mm-long crystal.

To further confirm our results, we also measured the performance of a 60-mm-long LB4 crystal with the same two beams. The resultant data appears in FIG. 5, and shows an even greater advantage in the use of a High-walkoff beam.

Our discovery is that input beams with significant walkoff of the output beam in the nonlinear crystal suffer less of a reduction in output-beam power than beams with little or no walkoff, for the case where there are effects related to the absorption of the output beam in the crystal. Thus, in cases of absorption, a high-walkoff beam can be more efficient for nonlinear conversion than a low-walkoff beam. Conventionally, the walkoff effect has been considered to be the cause of the deterioration of the quality of the output beam, but in the present invention, in order to increase the wavelength conversion efficiency, it is positively exploited as a means to distance the heat generation due to absorption of the input and output beams in the crystal. Following the same reasoning, a similar improvement in efficiency is likely to result for crystals where the output beam can generate significant photorefractive effects.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A nonlinear optical conversion device designed for operation at high optical power levels comprising:
    a nonlinear crystal having entrance and exit surfaces allowing input and output laser beams to propagate in the phase-matching plane for a desired nonlinear generation process,
    said nonlinear generation process involving a nonlinear interaction in said nonlinear crystal and resultant conversion of power in one or two input beams into power in the output beam,
    said nonlinear crystal characterized by absorption and resultant modification of the crystal properties by the power in the output beam, said modification with the potential for reducing the efficiency of the nonlinear process in said crystal, and
    said nonlinear process involving critical phase-matching in the nonlinear crystal in which the powers in the output beam and input beam or beams propagate in different directions through the process of Poynting vector walk-off,
    said input beam or beams being of a sufficiently small beam dimension in the phase-matching plane such that said output beam spatially separates from said input beam or beams in a length small compared to the length of said crystal, thereby removing much of the modification of the properties of said nonlinear crystal from the region of the nonlinear interaction involving said input beams, and leading to improved conversion of power in the input beams over configurations in which the spatial separation of the input and output beams is minimal over the length of said crystal.

2. A nonlinear optical conversion device as described in claim 1 where:
    said nonlinear generation process involving a nonlinear interaction in said nonlinear crystal and resultant conversion of power in the input beam into power in the output beam, where the optical frequency of the output beam is twice that of the input beam,
    said nonlinear process involving critical phase-matching in the nonlinear crystal in which the powers in the output beam and input beam propagate in different directions through the process of Poynting vector walk-off,
    said input beam being of a sufficiently small beam dimension in the phase-matching plane such that said output beam spatially separates from said input beam in a length small compared to the length of said crystal, thereby removing much of the modification of the properties of said nonlinear crystal from the region of the nonlinear interaction involving said input beam, and leading to improved conversion of power in the input beam over configurations in which the spatial separation of the input and output beams is minimal over the length of said crystal.

3. A nonlinear optical conversion device as described in claim 1 where:
    said nonlinear generation process involving a nonlinear interaction in said nonlinear crystal and resultant conversion of power in two input beams into power in the output beam, where the optical frequency of the output beam is the sum of that of the two input beams,
    said nonlinear process involving critical phase-matching in the nonlinear crystal in which the powers in the output beam and input beams propagate in different directions through the process of Poynting vector walk-off,
    said input beams being of a sufficiently small beam dimension in the phase-matching plane such that said output beam spatially separates from said input beams in a length small compared to the length of said crystal, thereby removing much of the modification of the properties of said nonlinear crystal from the region of the nonlinear interaction involving said input beams, and leading to improved conversion of power in the input beams over configurations in which the spatial separation of the input and output beams is minimal over the length of said crystal.

4. A nonlinear optical conversion device as described in claim 1 where:

said nonlinear generation process involving a nonlinear interaction in said nonlinear crystal and resultant conversion of power in two input beams into power in the output beam, where the optical frequency of the output beam is the difference of that of the two input beams, said nonlinear process involving critical phase-matching in the nonlinear crystal in which the powers in the output beam and input beams propagate in different directions through the process of Poynting vector walk-off, said input beams being of a sufficiently small beam dimension in the phase-matching plane such that said output beam spatially separates from said input beams in a length small compared to the length of said crystal, thereby removing much of the modification of the properties of said nonlinear crystal from the region of the nonlinear interaction involving said input beams, and leading to improved conversion of power in the input beams over configurations in which the spatial separation of the input and output beams is minimal over the length of said crystal.

5. A nonlinear optical conversion device as described in claim 1 where:

said modification of the crystal properties is due to heating of the crystal by beam absorption created in the crystal from the power in the output beam.

6. A nonlinear optical conversion device as described in claim 2 where:

said modification of the crystal properties is due to heating of the crystal by beam absorption created in the crystal from the power in the output beam.

7. A nonlinear optical conversion device as described in claim 3 where:

said modification of the crystal properties is due to heating of the crystal by beam absorption created in the crystal from the power in the output beam.

8. A nonlinear optical conversion device as described in claim 4 where:

said modification of the crystal properties is due to heating of the crystal by absorption of the power in the output beam.

9. A nonlinear optical conversion device as described in claim 1 where:

said modification of the crystal properties is due to photorefractive-related modification of the crystal from the power in the output beam.

10. A nonlinear optical conversion device as described in claim 2 where:

said modification of the crystal properties is due to photorefractive-related modification of the crystal from the power in the output beam.

11. A nonlinear optical conversion device as described in claim 3 where:

said modification of the crystal properties is due to photorefractive-related modification of the crystal from the power in the output beam.

12. A nonlinear optical conversion device as described in claim 5 where the nonlinear crystal is lithium tetraborate ($Li_2B_4O_7$).

13. A nonlinear optical conversion device as described in claim 12 where the wavelength of the output beam is less than approximately 320 nm.

14. A nonlinear optical conversion device as described in claim 13 where there is a single input beam and the wavelength of the output beam is half of that of the input beam.

15. A nonlinear optical conversion device as described in claim 14 where the input beam is comprised of the second harmonic of the output of a Q-switched, neodymium (Nd)-doped solid state laser.

16. A nonlinear optical conversion device as described in claim 15 where the Nd-doped solid state laser is based on the laser crystal $LYF_4$ (YLF).

\* \* \* \* \*